US012783365B2

(12) United States Patent
Kwon et al.

(10) Patent No.: US 12,783,365 B2
(45) Date of Patent: Nov. 3, 2026

(54) APPARATUS AND METHOD OF DATA ANOMALY DETECTION BASED ON IMPORTANT FEATURE VALUE AND LOW COMPLEXITY MODEL

(71) Applicant: FOUNDATION OF SOONGSIL UNIVERSITY-INDUSTRY COOPERATION, Seoul (KR)

(72) Inventors: Min Hae Kwon, Seoul (KR); Mi Ru Kim, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 573 days.

(21) Appl. No.: 18/219,642

(22) Filed: Jul. 7, 2023

(65) Prior Publication Data

US 2024/0241800 A1 Jul. 18, 2024

(30) Foreign Application Priority Data

Jan. 17, 2023 (KR) ........................ 10-2023-0007035

(51) Int. Cl.
*G06F 11/00* (2006.01)
*G06F 11/14* (2006.01)
(Continued)

(52) U.S. Cl.
CPC .......... *G06F 11/1471* (2013.01); *G06F 11/14* (2013.01); *G06N 3/0455* (2023.01); *G06N 3/08* (2013.01)

(58) Field of Classification Search
CPC ....................................................... G06F 11/14
See application file for complete search history.

(56) References Cited

U.S. PATENT DOCUMENTS

2018/0322394 A1 11/2018 Nguyen et al.
2023/0089481 A1* 3/2023 Liu ...................... G06N 3/0455 706/15

FOREIGN PATENT DOCUMENTS

CN 110275505 A 9/2019
CN 113067754 A 7/2021
(Continued)

OTHER PUBLICATIONS

Sungtaek Oh et al., "A Study on Lightweight Artificial Neural Network Technology for Detection of Abnormalities in IoT Environment", Journal of the Korea Institute of Information Security and Cryptology (JKIISC), vol. 29, No. 6, 2019, pp. 53-58.
(Continued)

*Primary Examiner* — Ajith Jacob
(74) *Attorney, Agent, or Firm* — Bridgeway IP Law Group, PLLC; Sang Ho Lee; Hyun Woo Shin

(57) ABSTRACT

Provided is an anomaly detection method performed by an electronic device. The method performed by an electronic device including one or more processors, a communication circuit which communicates with an external device, and one or more memories storing at least one instruction executed by the one or more processors may include: by the one or more processors, receiving target data for discriminating whether an anomaly occurs, in which the target data includes a value for each of a plurality of features; inputting a value for at least one important feature among the plurality of features into an anomaly detection model, in which the at least one important feature is determined by important feature information received from the external device; and determining whether the target data is abnormal based on an output of the anomaly detection model.

6 Claims, 6 Drawing Sheets

(51) Int. Cl.

| | |
|---|---|
| ***G06F 11/1471*** | (2026.01) |
| ***G06N 3/0455*** | (2023.01) |
| ***G06N 3/08*** | (2023.01) |

(56) References Cited

FOREIGN PATENT DOCUMENTS

| | | |
|---|---|---|
| KR | 10-2271740 B1 | 7/2021 |
| KR | 10-2479218 B1 | 12/2022 |

OTHER PUBLICATIONS

Mi Ru Kim, et al., "Low-complex Anomaly Detection Method Using Important Features". The 3rd Korea Artificial Intelligence Conference, Sep. 2022.

* cited by examiner

APPARATUS AND METHOD OF DATA ANOMALY DETECTION BASED ON IMPORTANT FEATURE VALUE AND LOW COMPLEXITY MODEL

CROSS-REFERENCE TO RELATED APPLICATIONS

This application claims the priority of Korean Patent Application No. 10-2023-0007035 filed on Jan. 17, 2023, in the Korean Intellectual Property Office, the disclosure of which is incorporated herein by reference.

STATEMENT REGARDING PRIOR DISCLOSURES BY THE INVENTOR OR A JOINT INVENTOR

The non-patent literature reference ("Low-complex Anomaly Detection Method Using Important Features", NPL citation No. 2) submitted herewith in an information disclosure statement pursuant to 37 CFR § 1.97 is a prior disclosure by the joint inventors made 1 year or less before the effective filing date of the instant application, and thus, is not prior art to the instant application as an exception under 35 USC § 102(b)(1).

BACKGROUND

Field

The present disclosure relates to a data anomaly detection technology and particularly to a technology of detecting anomaly of data based on an important feature value and a low complexity model.

Description of the Related Art

An autoencoder model used in the related art is a deep learning model, so the autoencoder model has a high-complexity computation amount. In addition, an RaPP method has improved performance compared to the conventional autoencoder model, but has a larger computation amount. However, a device to which an anomaly detection technology is applied is generally a low-specification IoT device, and in the low-specification IoT device, there is a difficulty in performing a high-complexity computation.

Therefore, in the art, the demand for anomaly detection algorithms with reduced computational complexity has increased so as to be performed in the low-specification IoT device.

SUMMARY

According to various exemplary embodiments of the present disclosure, a technical object is to provide a technology of detecting anomaly of data based on an important feature value and a low complexity model.

According to one aspect of the present disclosure, an anomaly detection method performed by an electronic device may be provided. The method performed by an electronic device including one or more processors, a communication circuit which communicates with an external device, and one or more memories storing at least one instruction executed by the one or more processors may include: by the one or more processors, receiving target data for discriminating whether an anomaly occurs, in which the target data includes a value for each of a plurality of features; inputting a value for at least one important feature among the plurality of features into an anomaly detection model, in which the at least one important feature is determined by important feature information received from the external device; and determining whether the target data is abnormal based on an output of the anomaly detection model.

In one exemplary embodiment, the external device may determine the at least one important feature among the plurality of features included in the target data based on an autoencoder model.

In one exemplary embodiment, the anomaly detection model may be a low complexity model having a lower complexity than the autoencoder model.

In one exemplary embodiment, the anomaly detection model may be a model learned based on at least one technique of isolation forest, principal component analysis (PCA), support vector machine (SVM), a density-based spatial clustering of applications with noise (DBSCAN), or normal distribution technique.

In one exemplary embodiment, the determining of whether the target data is abnormal may include comparing an evaluation score calculated by an output of the anomaly detection model and a critical score, and determining the target data as anomaly data when the evaluation score is equal to or less than the critical score.

According to another aspect of the present disclosure, an anomaly detection method performed by an electronic device may be provided. The method performed by an electronic device including one or more processors, a communication circuit which communicates with an external device, and one or more memories storing at least one instruction executed by the one or more processors may include: by the one or more processors, acquiring an original data set constituted by data of the same format as target data to be subjected to anomaly detection; determining at least one important feature among a plurality of features of data based on an autoencoder model and the original data set; and transmitting important feature information including information on the at least one important feature to the external device through the communication circuit.

In one exemplary embodiment, the determining of the at least one important feature may include calculating a reconstruction error of the original data set by using the autoencoder model, calculating a reconstruction error of a modified data set in which a specific feature value of data included in the original data set is changed by using the autoencoder model, and calculating an importance level of the specific feature value based on the reconstruction error of the original data set and the reconstruction error of the modified data set.

In one exemplary embodiment, the determining of the at least one important feature may include calculating each of a first reconstruction error change amount for a specific feature in a normal data set included in the original data set, and a second reconstruction error change amount for the specific feature in an anomaly data set included in the original data set.

In one exemplary embodiment, the first reconstruction error change amount may be calculated based on a reconstruction error of a first data set in which the value of the specific feature of each data included in the normal data set is not modified, and a reconstruction error of a second data set in which the value of the specific feature of each data included in the normal data set is modified, and the second reconstruction error change amount may be calculated based on a reconstruction error of a third data set in which the value of the specific feature of each data included in the anomaly data set is not modified, and a reconstruction error of a fourth data set in which the value of the specific feature of each data included in the anomaly data set is modified.

In one exemplary embodiment, the specific feature may be a feature having a larger importance level than other features of the data as the first reconstruction error change amount for the specific feature is larger and the second reconstruction error change amount for the specific feature is larger.

According to yet another aspect of the present disclosure, an electronic device may include: a communication circuit which communicates with an external device; one or more processors; and one or more memories storing at least one instruction executed by the one or more processors, and the one or more processors may be configured to receive target data for discriminating whether an anomaly occurs, in which the target data includes a value for each of a plurality of features, input a value for at least one important feature among the plurality of features into an anomaly detection model, in which the at least one important feature is determined by important feature information received from the external device, and determine whether the target data is abnormal based on an output of the anomaly detection model.

According to still yet another aspect of the present disclosure, an electronic device may include: a communication circuit which communicates with an external device; one or more processors; and one or more memories storing at least one instruction executed by the one or more processors, and the one or more processors may be configured to acquire an original data set constituted by data of the same format as target data to be subjected to anomaly detection, determine at least one important feature among a plurality of features of data based on an autoencoder model and the original data set, and transmit important feature information including information on the at least one important feature to the external device through the communication circuit.

According to at least one exemplary embodiment of the present disclosure, it is judged whether input data is abnormal through a model having a lower complexity than an autoencoder model by using an important feature corresponding to some of input data to rapidly judge whether the input data is abnormal while consuming a small computing power.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
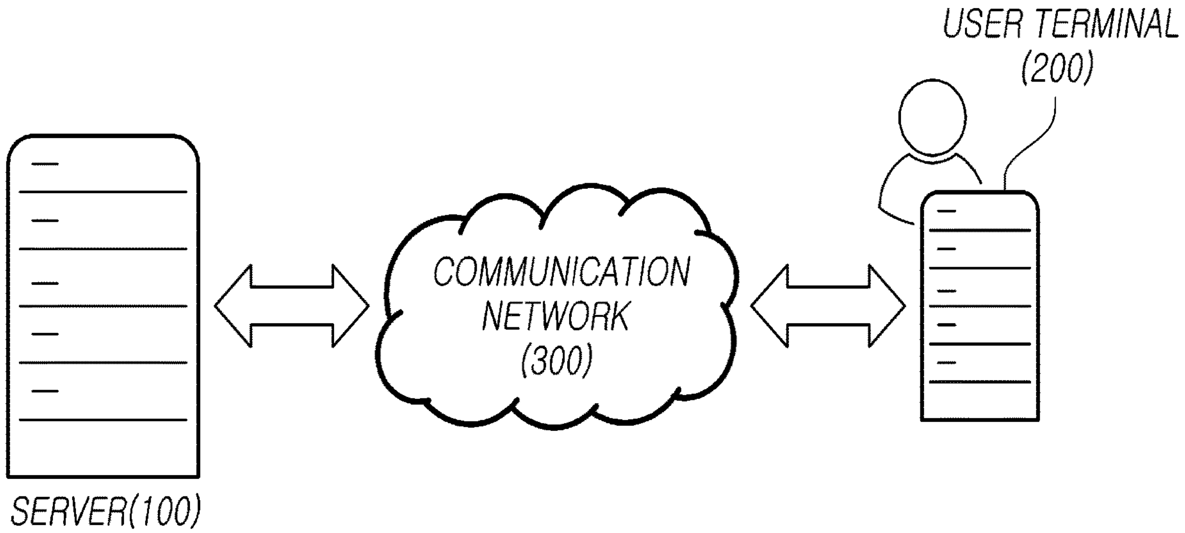
FIG. 1 is a diagram illustrating a system including a server, a user terminal, and a communication network according to an exemplary embodiment of contents disclosed in the present specification.

Various exemplary embodiments described in the present disclosure are illustrated to clearly explain the technical ideas of the present disclosure, and are not intended to be limited to specific exemplary embodiments. The technical idea of the present disclosure includes various modifications, equalities, alternatives of each exemplary embodiment disclosed in this document, and an exemplary embodiment that is selectively combined from all or part of each exemplary embodiment described in this document. In addition, the scope of the rights of the technical idea of the present disclosure is not limited to various exemplary embodiments presented below or specific explanations.

Further, if not contrarily defined, all terms used herein including technological or scientific terms have meanings generally understood by a person with ordinary skill in the art.

Expressions such as "include", "can include", "provided", "can be provided", "have", "can have", etc., used in this document mean that targeted features (e.g., a function, an operation, or a component) exist, and do not exclude existence of other additional features. In other words, such expressions should be understood as open-ended terms that contain the possibility of including other exemplary embodiments.

The expression of the singular type used in this document may include a plural type meaning unless it means differently in context, which is similarly applied to the expression of the singular type described in the claim.

An expression such as "first" or "second" used in this document is used for distinguishing one object from other objects in referring to a plurality of homogeneous objects, and does not limit the order or importance between the objects.

An expression "A, B, and C", "A, B, or C", "at least one of A, B, and C", or "at least one of A, B, or C" may mean each listed item or all possible combinations of the listed items. For example, "at least one of A or B" may refer to (1) at least one A, (2) at least one B, and (3) both at least one A and at least one B.

An expression "based on" used in this document is used to describe one or more factors that affect an action or operation of determination and judgment, which is described in a phase or sentence including the corresponding expression, and this expression does not exclude an additional factor that affects the action or operation of the determination or judgment.

An expression with any component (e.g., a first component) being "connected to" or "accessing" the other component (e.g., a second component) used in this document may mean the any component being connected or accessing the other component via another new component (e.g., a third component) in addition to the any component being directly connected to or accessing the other component.

An expression "configured to" used in this document may have a meaning such as "set to", "have an ability to", "changed to", "made to", "can", etc., according to the context. The corresponding expression is not limited to a meaning of "specially designed in hardware", and for example, a processor configured to perform a specific operation may mean a generic purpose processor which can perform the specific operation by executing software, or a special purpose computer structuralized through programming so as to perform the corresponding specific operation.

Hereinafter, various exemplary embodiments of the present disclosure will be described with reference to the accompanying drawings. In the accompanying drawings or descriptions for the drawings, the same or substantially equivalent component may be denoted by the same reference numeral. In addition, hereinafter, in the description of various exemplary embodiments, it may be omitted to redundantly describe the same or corresponding components, but this does not mean that the component is not included in the exemplary embodiment.

FIG. 1 is a diagram illustrating a system including a server 100, a user terminal 200, and a communication network 300 according to an exemplary embodiment of contents disclosed in the present specification. The server 100 and the user terminal 200 may transmit and receive information to and from each other through the communication network 300.

The server 100 may be an electronic device for learning an autoencoder model or a deep neural network model in the anomaly detection method according to the present disclosure. In the present disclosure, the server 100 may be referred to as "high-performance device" which means that the server 100 has a higher computing performance than the user terminal 200. The server 100 as an electronic device that transmits information on an important feature of the deep neural network model or data determined by the deep neural network model to the user terminal 200 connected wiredly or wirelessly may be, for example, an application server, a proxy server, a cloud server, etc. Further, the server 200 as the electronic device may be at least one of a smartphone, a tablet computer, a personal computer (PC), a mobile phone, a personal digital assistant (PDA), an audio player, and a wearable device.

The user terminal 200 may be an electronic device that learns and uses a low complexity model based on the important feature of the data. In the present disclosure, the user terminal 200 may also be referred to as "low-specific device" or "low-performance device" which has a lower computing performance than the server 100. Further, the user terminal 200 may be, for example, at least one of the smartphone, the tablet computer, the personal computer (PC), the mobile phone, the personal digital assistant (PDA), the audio player, and the wearable device. Further, the user terminal 200 as an electronic device different from the server 100 may be the application server, the proxy server, the cloud server, etc.

In the present disclosure of the present specification, when a configuration or an operation of one device is described, the term "device" is a term for referring to a device to be described, and the term "external device" may be used as a term for referring to a device which exists outside from the viewpoint of the device to be described. In addition, for example, when the server 100 is described as "device", the user terminal 200 may be called "external device" from the viewpoint of the server 100. For example, when the user terminal 200 is described as "device", the server 100 may be called "external device" from the viewpoint of the user terminal 200. That is, the user terminal 200 and the server 100 may be referred to as "device" and "external device", respectively, according to the viewpoint of an operating subject, or may be referred to as "external devices" and "device", respectively.

The communication network 300 may include both wired and wireless networks. The communication network 300 may allow data to be exchanged between the server 100 and the user terminal 200. The wired communication network may include a communication network according to a scheme such as Universal Serial Bus (USB), High-Definition Multimedia Interface (HDMI), Recommended Standard-232 (RS-232), or Plain Old Telephone Service (POTS), for example. The wireless communication network may include a communication network according to a scheme such as enhanced Mobile Broadband (eMBB), Ultra Reliable Low-Latency Communications (URLLC), Massive Machine Type Communications (MMTC), Long-Term Evolution (LTE), LTE Advance (LTE-A), New Radio (NR), Universal Mobile Telecommunications System (UMTS), Global System for Mobile communications (GSM), Code Division Multiple Access (CDMA), Wideband CDMA (WCDMA), Wireless Broadband (WiBro), Wireless Fidelity (WiFi), Bluetooth, Near Field Communication (NFC), Global Positioning System (GPS), or Global Navigation Satellite System (GNSS), for example. The communication network 300 of the present specification is not limited to the above-described examples, and may include various types of communication networks that allow data to be exchanged between a plurality of subjects or devices without a limitation.

In the present specification, an artificial neural network model, a network function, a neural network, etc. may be used interchangeably as a term representing a specific data structure. The artificial neural network model may be generally constituted by a set of calculation units which are mutually connected to each other, which may be called "node". The nodes may also be called neurons. The artificial neural network model is configured to include one or more nodes. The nodes (or neurons) may be mutually connected to each other by one or more links.

In the artificial neural network model, one or more nodes connected through the link may relatively form the relationship between an input node and an output node. Concepts of the input node and the output node are relative and a predetermined node which has the relationship of the output node with respect to one node may have the relationship of the input node in the relationship with another node and vice versa. As described above, the relationship of the output node to the input node may be generated based on the link. One or more output nodes may be connected to one input node through the link and vice versa. In the relationship of the input node and the output node connected through one link, a value of data of the output node may be determined based on data input in the input node. Here, a link connecting the input node and the output node to each other may have a weight. The weight may be variable and the weight may be varied by a user or an algorithm in order for the artificial neural network model to perform a predetermined function. For example, when one or more input nodes are mutually connected to one output node by the respective links, the output node may determine an output node value based on values input in the input nodes connected with the output node and the weights set in the links corresponding to the respective input nodes.

The artificial neural network model may be constituted by a set of one or more nodes. A subset of the nodes included in the artificial neural network model may constitute a layer. Some of the nodes constituting the artificial neural network model may constitute one layer based on the distances from the initial input node. For example, a set of nodes of which distance from the initial input node is n may constitute n layers. The distance from the initial input node may be defined by the minimum number of links which should be passed through to reach the corresponding node from the initial input node. However, a definition of the layer is predetermined for description, and the order of a specific layer in the artificial neural network model may be defined by a method different from the aforementioned method. For example, the layers of the nodes may be defined by the distance from a final output node. The initial input node may mean one or more nodes in which data is directly input without passing through the links in the relationships with other nodes among the nodes in the artificial neural network model. Alternatively, in the artificial neural network model, in the relationship between the nodes based on the link, the initial input node may mean nodes which do not have other input nodes connected through the links. Similarly thereto, the final output node may mean one or more nodes which do not have the output node in the relationship with other nodes among the nodes in the artificial neural network model. Further, a hidden node may mean not the initial input node and the final output node but the nodes constituting the artificial neural network model.

The artificial neural network model may be learned in at least one scheme of supervised learning, unsupervised learning, semi-supervised learning, or reinforcement learning. The learning of the artificial neural network model may be a process of renewing node weights included in the artificial neural network model so that the artificial neural network model calculates specific output data for specific input data.

The artificial neural network model may be learned in the direction of minimizing an error of output (or output data). The artificial neural network model may be learned based on an operation of inputting learning data into the artificial neural network model, an operation of obtaining the output data of the artificial neural network model for the input learning data, an operation of calculating an error between the output data and a ground truth, and an operation of updating the weight of each node of the artificial neural network model by back-propagating the error toward an input layer from an output layer of the artificial neural network model in order to reduce the calculated error.

Figure 2:
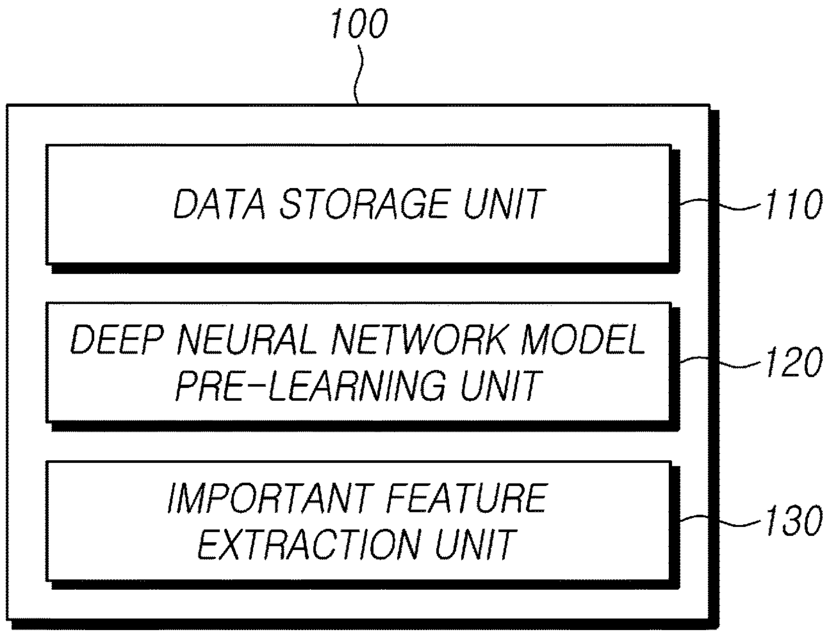
FIG. 2 is a diagram illustrating the server according to an exemplary embodiment of the present disclosure.

FIG. 2 is a diagram illustrating the server 100 according to an exemplary embodiment of the present disclosure. The server 100 may include a data storage unit 110, a deep neural network model pre-learning unit 120, and an important feature extraction unit 130. In the present disclosure, "deep neural network (DNN) model" as a kind of artificial neural network model may be used as a term which refers to an artificial neural network model including a plurality of hidden layers between an input layer and an output layer.

The data storage unit 110 is a kind of "memory", which may store data for learning the deep neural network model. The data stored in the data storage unit 110 as data for learning the deep neural network model may be, for example, image data, character string data, and time series data.

The deep neural network model pre-learning unit 120 as a kind of "processor" may perform operations such as various calculations, processing, data generation, or machining required for learning the deep neural network model. The deep neural network model pre-learning unit 120 may learn the deep neural network model by using the data stored in the data storage unit 110.

The important feature extraction unit 130 as a kind of "processor" may calculate an importance level of each of a plurality of features having data input into the deep neural network model by using the learned deep neural network model, and determine at least one important feature. An important feature determination method of the important feature extraction unit 130 is described below in detail.

The server 100 may further include a communication circuit (not illustrated) and deliver information on the important feature to the user terminal 200 through a communication circuit.

The server 100 may include one or more processors (not illustrated) or memories (not illustrated) as the components in addition to the above-described configuration. In some exemplary embodiments, at least one of the components of the server 100 may be omitted or another component may be added to the server 100. In some exemplary embodiments, in addition, or in alternative to, some components may be integrated and implemented, or implemented as a single or a plurality of entities. At least some components of components inside or outside the server 100 are connected to each other through BUS, general purpose input/output (GPIO), serial peripheral interface (SPI), or mobile industry processor interface (MIPI) to transmit or receive data or a signal.

Figure 3:
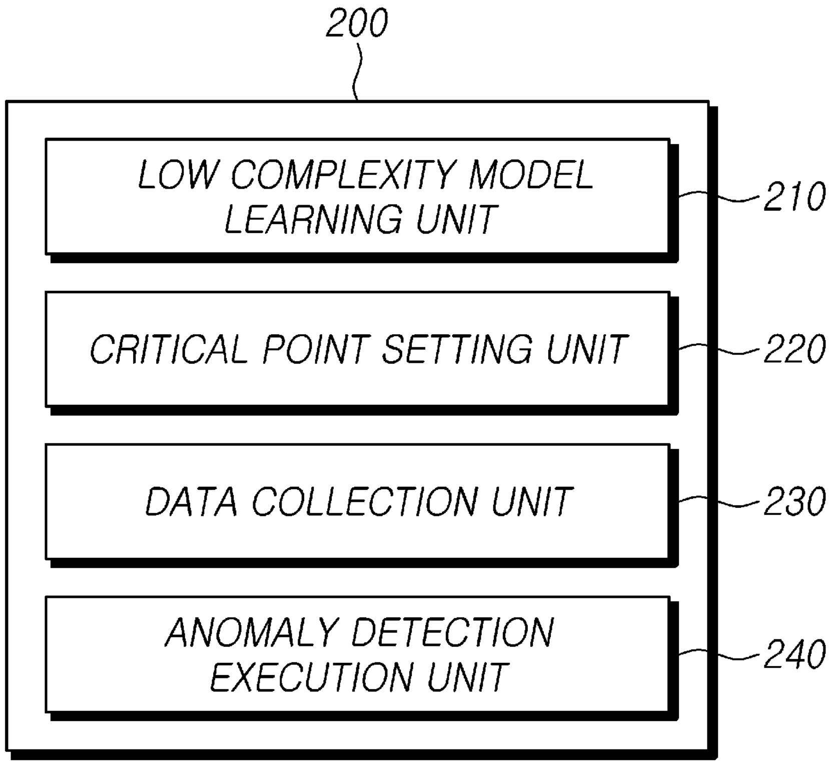
FIG. 3 is a diagram illustrating the user terminal according to an exemplary embodiment of the present disclosure.

FIG. 3 is a diagram illustrating the user terminal 200 according to an exemplary embodiment of the present disclosure. The user terminal 200 may include a low complexity model learning unit 210, a critical point setting unit 220, a data collection unit 230, and an anomaly detection execution unit 240.

The low complexity model learning unit 210 as a kind of "processor" may learn the low complexity model through the important feature value of the data based on important feature information received from the server 100. In the present disclosure, "low complexity model" as a term for referring to a specific data set required so that the number of parameters is smaller, a calculation speed is higher, or a smaller memory for the calculation is required than the autoencoder model may be interchangeably used with the term "anomaly detection model".

The critical point setting unit 220 as a kind of "processor" may set a critical point for anomaly detection based on an output of the learned anomaly detection model. For example, when the anomaly detection model calculates an evaluation score (e.g., anomaly data as the score is larger) for whether input data is abnormal, the critical point setting unit 220 may set a critical score for comparison with the evaluation score.

The data collection unit 230 as a kind of "memory" may store target data collected through another component of the user terminal 200 or a value for an important feature included in the target data.

The anomaly detection execution unit 240 as a kind of "processor" may judge whether the data collected by the data collection unit 230 is normal/anomaly by using the anomaly detection model learned through the low complexity model learning unit 210 and the critical point set by the critical point setting unit 220.

The user terminal 200 may include one or more processors (not illustrated), communication circuits (not illustrated), or memories (not illustrated) as components in addition to the above-described configuration. In some exemplary embodiments, at least one of the components of the user terminal 200 may be omitted or another component may be added to the user terminal 200. In some exemplary embodiments, in addition, or in alternative to, some components may be integrated and implemented, or implemented as a single or a plurality of entities. At least some components of components inside or outside the user terminal 200 are connected to each other through BUS, general purpose input/output (GPIO), serial peripheral interface (SPI), mobile industry processor interface (MIPI), or the like to transmit or receive data or a signal.

Hereinafter, each step of an anomaly detection method according to the present disclosure will be described with reference to FIG. 4.

Figure 4:
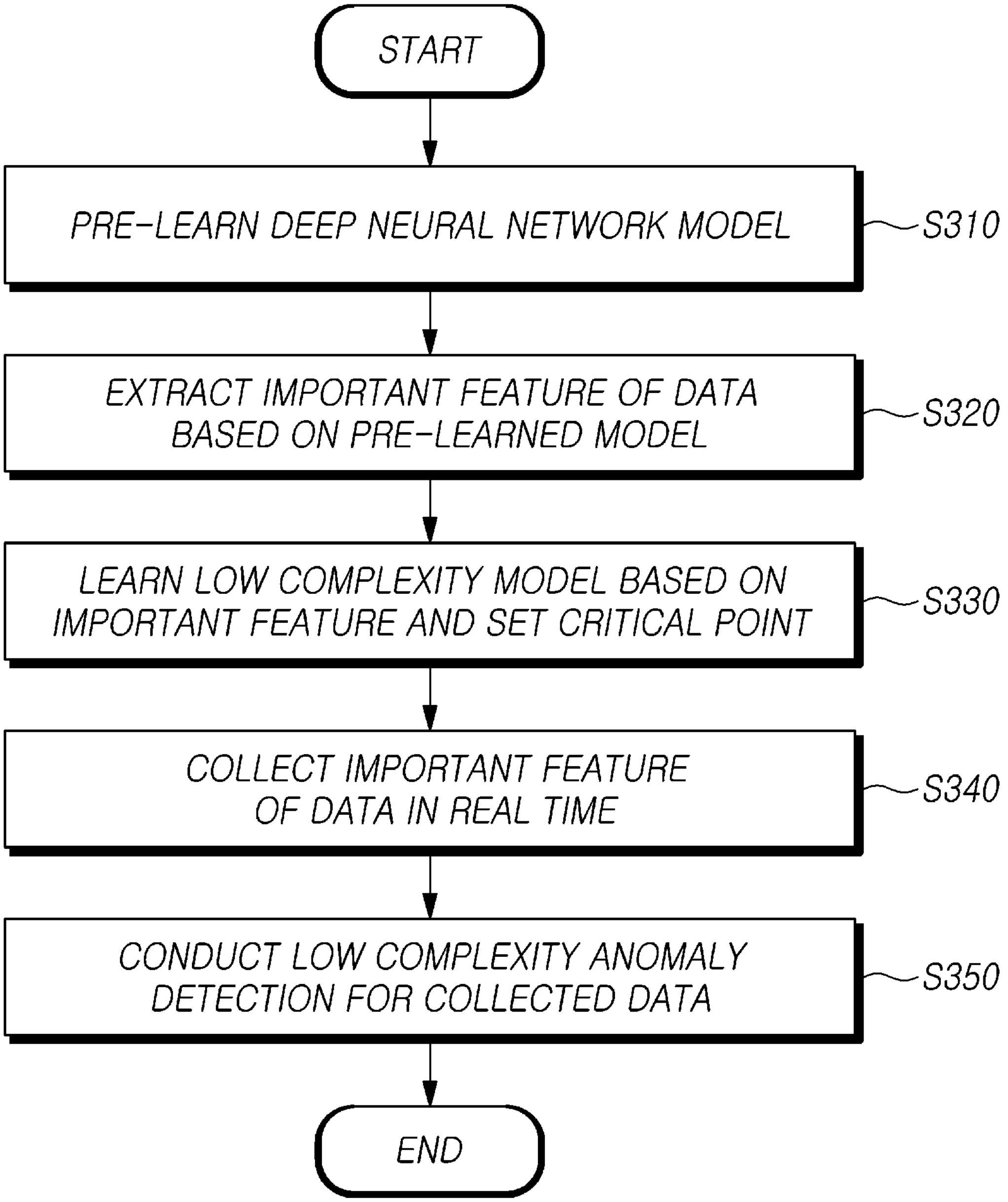
FIG. 4 is a flowchart illustrating each step of an anomaly detection method performed by a plurality of subjects according to an exemplary embodiment of the present disclosure.

FIG. 4 is a flowchart illustrating each step of an anomaly detection method performed by a plurality of subjects according to an exemplary embodiment of the present disclosure. In the present specification, for convenience of description, it is described that the server 100 performs a learning operation of the deep neural network model and a determination operation of the important feature of the target data, and the user terminal 200 performs a learning operation of the anomaly detection model and an anomaly detection operation based on an important feature of the target data, but this is just an exemplary embodiment and does not limit the present disclosure. That is, each of the server 100 or the user terminal 200 as an independent electronic device including the processor, the memory, and the communication circuit may alone perform the anomaly detection method according to the present disclosure to be described below.

The server 100 may perform pre-learning of the deep neural network model (S310). In one exemplary embodiment of the present disclosure, the deep neural network model may be an autoencoder model.

Figure 5:
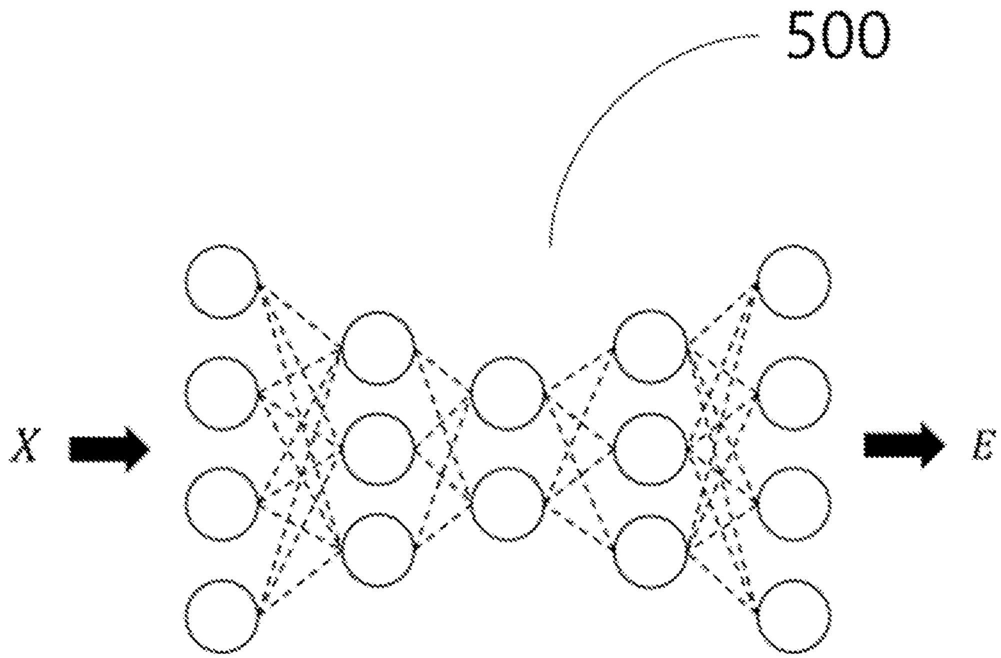
FIG. 5 is a diagram conceptually illustrating an autoencoder model according to an exemplary embodiment of the present disclosure.

FIG. 5 is a diagram conceptually illustrating an autoencoder model 500 according to an exemplary embodiment of the present disclosure. In the present disclosure, the "autoencoder model" may refer to one type of artificial neural network model and may be a term that refers to a data set having a specific data structure. The autoencoder model 500 may be an artificial neural network model that is learned to output output data similar to input data. The autoencoder model 500 may include at least one hidden layer disposed between the input and output layers. The autoencoder model 500 may include an encoder reducing a dimension of input data and a decoder restoring the reduced data again. The number of nodes included in each layer of the autoencoder model 500 may decrease from the input layer corresponding to the encoder to an intermediate layer (or bottleneck layer), and then increase from the intermediate layer corresponding to the decoder to the output layer. In this case, the intermediate layer (or bottleneck layer) may be a term which refers to a layer having the smallest number of nodes positioned between the encoder and the decoder. The autoencoder model 500 outputs reconstruction data x' through a process of reducing and restoring input original data x.

The anomaly detection method according to an exemplary embodiment of the present disclosure may determine whether the input data is abnormal by utilizing a reconstruction error E between input original data X and reconstruction data X' generated by the autoencoder model 500. For example, when the autoencoder model 500 is learned by using only normal data which is not anomaly (that is, the reconstruction error between the normal data and the reconstruction data of the autoencoder model 500 for the normal data is minimized), the autoencoder model 500 that completes learning may generate reconstruction data having a small reconstruction error for the normal data while generating reconstruction data having a relatively large reconstruction error for the anomaly data which is not learned. Through this, when the reconstruction error between the reconstruction data generated by the autoencoder model 500 and the input data is larger than a specific threshold, the corresponding input data may be judged as the anomaly data.

Next, the server 100 may extract the important feature of the data based on the pre-learned model (S320). Specifically, the server 100 may extract the important feature of the data by using the autoencoder model 500. The user terminal 200 may determine whether the data is abnormal through the important feature based on information on the important feature determined by the server 100. This will be described below in detail.

Figure 6:
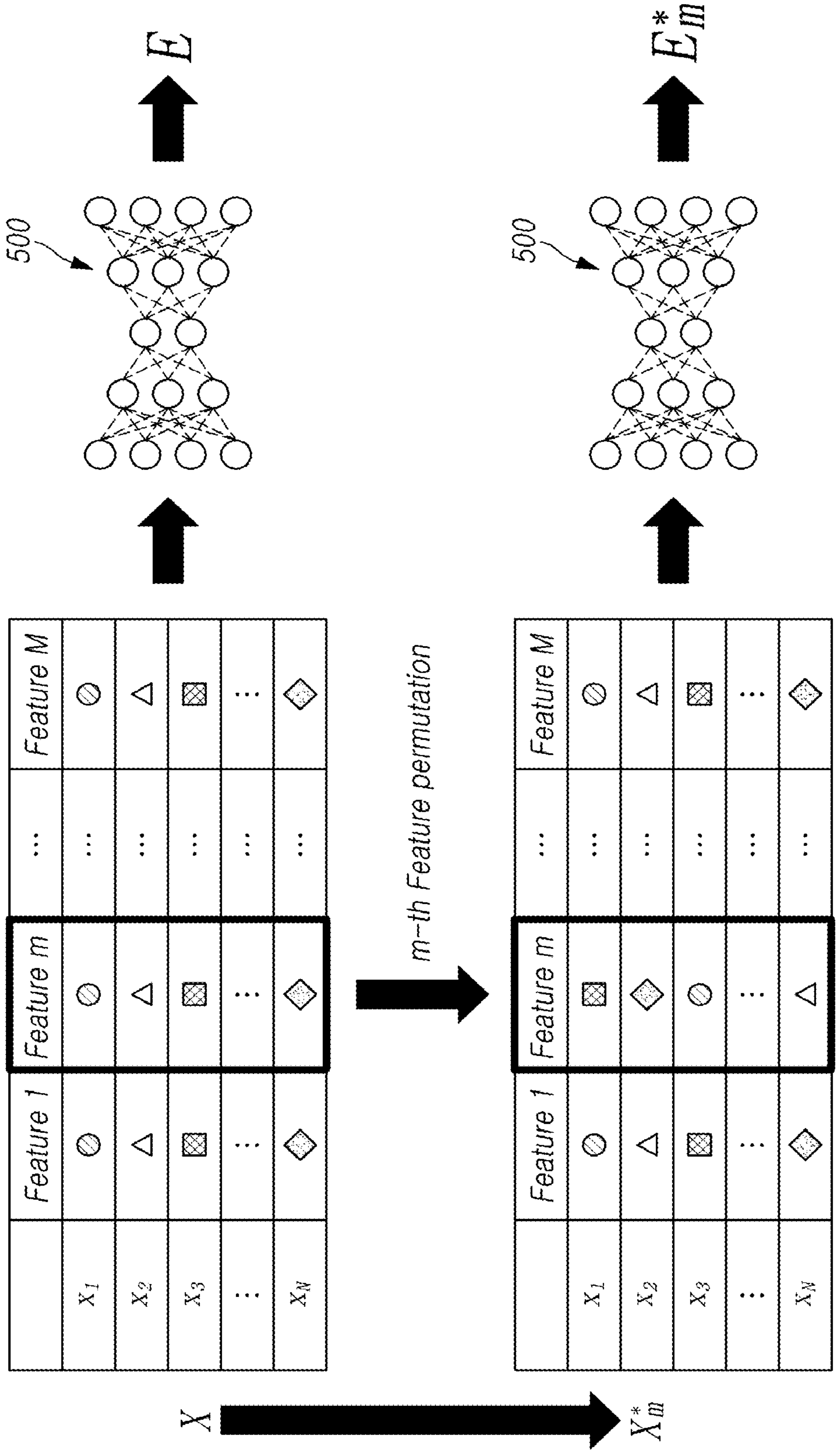
FIG. 6 is a diagram conceptually illustrating a method for extracting an important feature of data using an autoencoder model according to an exemplary embodiment of the present disclosure.

FIG. 6 is a diagram conceptually illustrating a method for extracting an important feature of data using an autoencoder model 500 according to an exemplary embodiment of the present disclosure. Hereinafter, a method for determining, by the server 100, at least one important feature among a plurality of features included in the input data by using the learned autoencoder model 500 will be described with reference to FIG. 6.

The server 100 may compare a reconstruction error E of the autoencoder model 500 for an original data set X and a reconstruction error $$E_m^*$$

of the autoencoder model 500 for a modified data set $$X_m^*$$

in which a value of an m-th feature is randomly changed, and calculate an importance of the m-th feature among the plurality of features included in the input data according to a comparison result.

A plurality of original data ($x_1$, $x_2$, . . . , $x_N$, N is any natural number of 2 or more) included in the original data set X of the present disclosure may include a value (hereinafter, also referred to as "feature value") for each of one or more predetermined features (feature 1, feature 2, . . . , feature m, . . . , feature M).

The server 100 may generate a restored data set $\hat{X}$ through the autoencoder model 500 for the original data set X, and calculate a reconstruction error E between the original data set X and the restored data set $\hat{X}$ therefor.

The server 100 may randomly change a specific feature value (e.g., the value of m-th feature (feature m)) in each original data included in the original data set X. For example, the server 100 randomly exchanges the m-th feature value of each original data included in the original data set X with an m-th feature value of another original data to randomly change the m-th feature value in each original data included in the original data set X. In the present disclosure, a data set in which the m-th feature value is changed from each original data included in the original data set X may be called "m-th feature change data set $$X_m^*".$$

The server 100 may generate the restored data set $$\hat{X}_m^*$$

through the autoencoder model 500 for the m-th feature change data set $$X_m^*,$$

and calculate a reconstruction error $$E_m^*$$

between the m-th feature change data set $$X_m^*,$$

and a restored data set $$\hat{X}_m^*$$

therefor.

Next, the server 100 may judge that the m-th feature among the plurality of features included in the input data is important as a difference between the reconstruction error E calculated for the original data set X and the reconstruction error $$E_m^*$$

calculated for the m-th feature change data set $$\hat{X}_m^*$$

is larger.

In another exemplary embodiment, the server 100 may determine the important feature by using the autoencoder model 500, and compute a reconstruction error change amount for the m-th feature in each of the normal data set and the anomaly data set to calculate the importance of the m-th feature.

Specifically, the server 100 may generate a restored normal data set $\hat{X}_{nor}$ for a first data set $X_{nor}$ (hereinafter, also referred to as "original normal data set") including the normal data by using the autoencoder model 500, and calculate a reconstruction error $E_{nor}$ between the first data set $X_{nor}$ and the restored normal data set $\hat{X}_{nor}$.

Further, the server 100 may generate a restored anomaly data set $\hat{X}_{abnor}$ for a second data set $X_{abnor}$ (hereinafter, also referred to as "original anomaly data set") including the anomaly data by using the autoencoder model 500, and calculate a reconstruction error $E_{abnor}$ between the second data set $X_{abnor}$ and the restored anomaly data set $\hat{X}_{abnor}$.

The reconstruction error for each of the first data set $X_{nor}$ and the second data set $X_{abnor}$ described above may be expressed as in Equation 1 below.

$$E_{nor} = \mathbb{E}(|X_{nor} - \hat{X}_{nor}|)$$
$$E_{abnor} = \mathbb{E}(|X_{abnor} - \hat{X}_{abnor}|)$$ [Equation 1]

Meanwhile, the server 100 may change a specific feature value (m-th feature value) in the plurality of normal data included in the original normal data set (i.e., the first data set), and generate a third data set $$X_{m,nor}^*$$

(hereinafter, also referred to as "original normal data set in which the m-th feature is changed") including the normal data in which the m-th feature value is changed. The server 100 may generate a restored data set $$\hat{X}_{m,nor}^*$$

for the third data set $$\hat{X}_{m,nor}^*$$

by using the autoencoder model 500, and calculate a reconstruction error $$E_{m,nor}^*$$

between the third data set $$X_{m,nor}^*$$

and the restored data set $$\hat{X}_{m,nor}^*$$

therefor.

Further, the server 100 may change an m-th feature value in the plurality of anomaly data included in the anomaly data set (i.e., the second data set), and generate a fourth data set $$X_{m,abnor}^*$$

(hereinafter, also referred to as "original anomaly data set in which the m-th feature is changed") including the anomaly data in which the m-th feature value is changed. The server 100 may generate a restored data set $$\hat{X}_{m,abnor}^*$$

for the fourth data set $$X^*_{m,abnor}$$

by using the autoencoder model 500, and calculate a reconstruction error $$E^*_{m,abnor}$$

between the fourth data set $$X^*_{m,abnor}$$

and the restored data set $$\hat{X}^*_{m,abnor}$$

therefor.

The reconstruction error for each of the third data set $$X^*_{m,nor}$$

and the fourth data set $$X^*_{m,abnor}$$

described above may be expressed as in Equation 2 below.

$$E^*_{m,nor} = \mathbb{E}(|X^*_{m,nor} - \hat{X}^*_{m,nor}|) \quad \text{[Equation 2]}$$

$$E^*_{m,abnor} = \mathbb{E}(|X^*_{m,abnor} - \hat{X}^*_{m,abnor}|)$$

Next, the server 100 may calculate a first reconstruction error change amount $d_{m,nor}$ in the normal data set after exchanging the m-th feature, and a second reconstruction error change amount $d_{m,abnor}$ in the anomaly data set after exchanging the m-th feature through Equation 3 jointly with Equations 1 and 2.

$$d_{m,nor} = E^*_{m,nor} - E_{nor} \quad \text{[Equation 3]}$$

$$d_{m,abnor} = E_{abnor} - E^*_{m,abnor}$$

The reconstruction error change amount $d_{m,nor}$ in the normal data set represents the importance level of the m-th feature for the normal data, and has a larger value as the reconstruction error $$E^*_{m,nor}$$

after exchanging the m-th feature becomes larger than the reconstruction error $E_{nor}$ before exchanging the m-th feature. That is, since the autoencoder model 500 is learned to minimize the reconstruction error for the normal data, the importance level of the m-th feature has a larger value as the reconstruction error $$E^*_{m,nor}$$

of the normal data in which the m-th feature is modified becomes larger than a reconstruction error $E_{nor}$ for the normal data in which the m-th feature is modified. In other words, as a change amount $$(E^*_{m,nor} - E_{nor})$$

between the reconstruction error $$E^*_{m,nor}$$

of the normal data in which the m-th feature is modified and the reconstruction error $E_{nor}$ of the normal data (original normal data) in which the m-th feature is not modified becomes larger, the m-th feature may be judged as a more important feature.

On the contrary, the reconstruction error change amount $d_{m,abnor}$ in the anomaly data set represents the importance level of the m-th feature for the anomaly data, and has a larger value as the reconstruction error $$E^*_{m,abnor}$$

after exchanging the m-th feature becomes smaller than the reconstruction error $E_{abnor}$ before exchanging the m-th feature. That is, since the reconstruction error for the anomaly data is derived to be relatively large in the autoencoder model 500, the importance level of the m-th feature has a larger value as the reconstruction error $$E^*_{m,abnor}$$

nor of the anomaly data in which the m-th feature is modified becomes smaller than a reconstruction error $E_{abnor}$ for the anomaly data in which the m-th feature is not modified. In other words, as a change amount $$(E_{abnor} - E^*_{m,abnor})$$

between the reconstruction error $E_{abnor}$ of the anomaly data (original anomaly data) in which the m-th feature is not modified and the reconstruction error $$E^*_{m,abnor}$$

of the anomaly data in which the m-th feature is modified becomes larger, the m-th feature may be judged as a more important feature.

As described above, the server 100 according to the present disclosure computes each of the reconstruction error change amount for the m-th feature in the normal data set and the reconstruction error change amount for the m-th feature in the anomaly data set to calculate the importance level of the m-th feature in the data. The importance level of the m-th feature may be calculated as in Equation 4 below.

$$D_m = d_{m,nor} + d_{m,abnor} \quad \text{[Equation 4]}$$

The server 100 may calculate the importance level of the m-th feature for each of all features (e.g., feature 1, feature 2, . . . , feature m, . . . , feature M) by a scheme shown in Equation 4, and determine a predetermined number of features as the important feature in the order of a higher importance level. Alternatively, the server 100 may also determine the important feature among a plurality of features by comparing the importance level for each of all features and a predetermined threshold importance level. Thereafter, the server 100 may transmit important feature information including information on at least one important feature to the user terminal 200.

Referring back to FIG. 4, the user terminal 200 may learn a low complexity model (i.e., anomaly detection model) based on the received important feature, and set a critical point (S330). Specifically, the user terminal 200 computes some important features among a plurality of features included in data through another model (i.e., anomaly detection model) different from the autoencoder model 500 to perform data anomaly detection.

The anomaly detection model as a model having a lower complexity than the autoencoder model 500 may have a smaller own capacity or the smaller number of parameters used for computation of the model than the autoencoder model 500.

The anomaly detection model according to one exemplary embodiment of the present disclosure may be a model learned based on at least one technique of isolation forest, principal component analysis (PCA), support vector machine (SVM), a density-based spatial clustering of applications with noise (DBSCAN), or normal distribution technique, for example.

Figure 7:
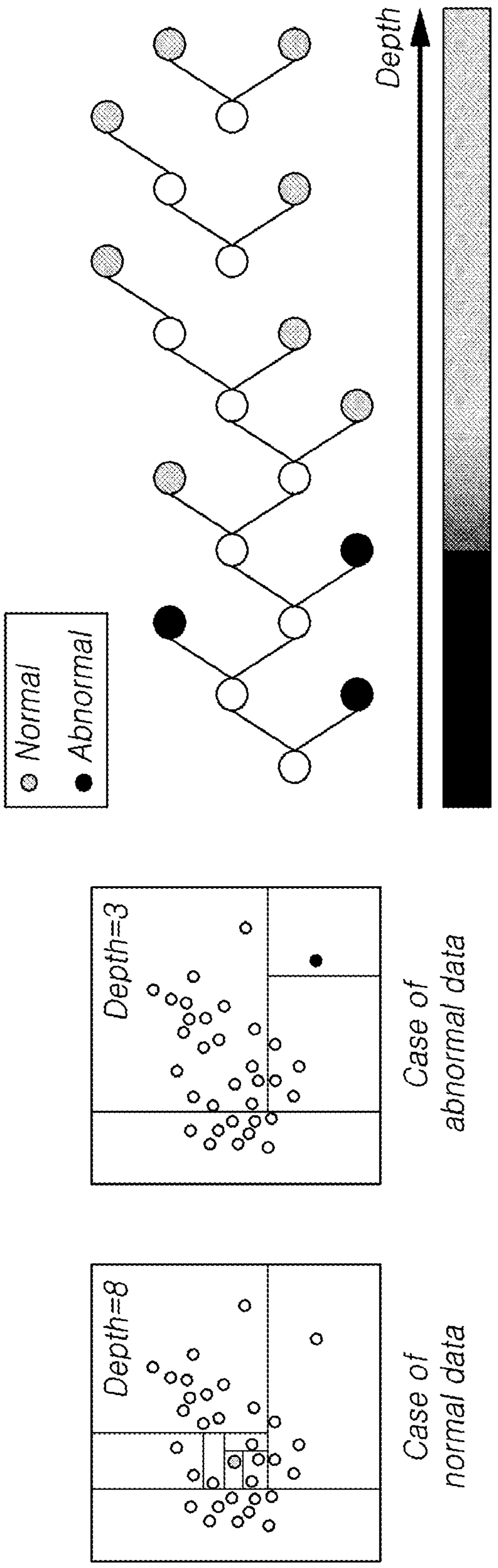
FIG. 7 is a diagram conceptually illustrating an isolation forest model.

FIG. 7 is a diagram conceptually illustrating an isolation forest model. The isolation forest model includes a plurality of root nodes, branch nodes, and terminal nodes, and each node may be a tree type data set configured to have at least one parameter such as a weight or a biased value. The parameter of each node included in the isolation forest model may be repeatedly updated through machine learning, and data delivered from a parent node may be separated according to a predetermined criterion.

The anomaly detection model as the isolation forest model may judge whether input data is abnormal by using a difference that when there are the normal data and the anomaly data, a node depth of a decision tree is not relatively large in order to separate the anomaly data having a relatively small data, while the node depth of the decision tree is relatively large in order to separate the normal data in which the distribution of the data is concentrated, for example.

The principal component analysis (PCA) is a scheme that reduces a dimension (i.e., the number of features) of the data by analyzing an axis that excellently indicates a scattering degree of given data. The anomaly detection model learned based on the principal component analysis (PCA) technique determines a normal data range for the important feature included in the data, and then determines whether the important feature value of the input data is included in the normal data range to judge whether the data is abnormal.

The support vector machine (SVM) primarily indicates a machine learning technique used for classification and regression analysis, or a model learned based thereon. For example, when a set of data which belongs to any one of two categories (normal/anomaly) is given, the SVM algorithm may generate a non-probabilistic binary linear categorization model of judging to which category new data belongs based on the given data set. The anomaly detection model learned based on the SVM algorithm may transfer data to an n-dimensional space (n is a natural number of 1 or more), and judge whether the data is normal or anomaly according to a boundary determined through learning. The density-based spatial clustering of applications with noise (DBSCAN) may mean a technique that transfers data to a point in a specific metric space, and clusters data according to a cluster including points. The anomaly detection model learned based on the DBSCAN technique clusters the important feature value of the normal data and the important feature value of the anomaly data to belong to different clusters to judge whether new input data is normal/anomaly.

Further, the anomaly detection model based on the normal distribution technique may calculate statistical values such as an average, a central value, a quadrant value, and distribution with respect to the important feature value of the normal data, and judge whether new input data is normal/anomaly according to whether the new input data belongs to a specific range (e.g., 3-sigma rule) of normal distribution for the normal data.

Various examples for the learning method of the anomaly detection model are just examples for the learning method of the anomaly detection model as the low complexity model, and do not limit the anomaly detection model of the present disclosure.

The user terminal 200 may learn the anomaly detection model by using only some determined important features among the plurality of features included in the input data, and determine whether the input data is abnormal through the learning. Specifically, it is assumed that initial input data (i.e., first input data) includes 100 feature values, and the autoencoder model 500 determines 10 features among 100 features included in the first input data as the important feature. In this case, the user terminal 200 may allow the anomaly detection model to judge whether the second input data is abnormal by using data including 10 determined important feature values as an input of the anomaly detection model.

According to the present disclosure, the anomaly detection model learned by using the important feature value of the data may calculate an evaluation score that means whether the input data is similar to the normal data. The user terminal 200 compares the evaluation score calculated by the anomaly detection model with a critical score to determine that data to be subjected to anomaly judgment is abnormal when the evaluation score is lower than the critical score. That is, the anomaly detection model receives, as an input, input data (second input data) having a reduced size as compared with the initial input data to calculate the evaluation score, and the user terminal 200 compares the evaluation score and the critical score to rapidly and accurately determine whether the initial input data is abnormal.

Next, the user terminal 200 may collect an important feature of data in real time (S340). The collected important feature of the data may be stored in the data collection unit 230 of the user terminal 200.

The user terminal 200 may perform low complexity anomaly detection for the collected data by using the learned anomaly detection model and the critical score (S350).

According to the present disclosure described above, the important feature of the input data is determined through the autoencoder model and it is judged whether input data is abnormal through a model having a lower complexity than an autoencoder model by using an important feature corresponding to some of the input data to rapidly judge whether the input data is abnormal while consuming a small computing power.

According to the present disclosure, since only some important features are used without using all acquired features of the data, there is an advantage in that the memory is used less. In addition, since the anomaly detection is conducted by using the anomaly detection model having a lower complexity than the deep neural network having a slow computation speed due to a large number of parameters, there is an advantage in that an anomaly detection speed is fast.

In the flowchart according to the contents disclosed in the present specification, respective steps of the method or algorithm are described in a sequential order, but the respective steps may be performed in the order in which the respective steps can arbitrarily be combined in addition to being performed sequentially. The description of the flowchart of the present specification does not exclude that the method or algorithm is changed or modified, and does not mean that any step is essential or preferred. In one exemplary embodiment, at least some steps can be performed in parallel, repeatedly, or heuristically. In one exemplary embodiment, at least some steps may be omitted or another step may be added.

Various exemplary embodiments according to the present specification may be implemented as software in a machine-readable storage medium. The software may be software for implementing various exemplary embodiments of the present specification. The software may be inferred from various exemplary embodiments of the present specification by programmers in the technical field to which the present disclosure belongs. For example, the software may be a program that includes a machine-readable instruction (e.g., code or code segment). The device as a device that can operate according to an instruction called from the storage medium may be, for example, a computer. In one exemplary embodiment, the device may be a computing device according to various exemplary embodiments of the present disclosure. In one exemplary embodiment, the processor of the device executes the called instruction to enable components of the device to perform a function corresponding to the instruction. In one exemplary embodiment, the processor may be a processor according to the exemplary embodiments of the present disclosure. The storage medium may mean all types of recording media storing data, which may be read by the device. The storage medium may include, for example, ROM, RAM, CD-ROM, magnetic tape, floppy disk, and optical data storage device. In one exemplary embodiment, the storage medium may be a memory. In one exemplary embodiment, the storage medium may also be implemented as a form distributed in a computer system connected by a network. The software may be distributed, stored, and executed in the computer system. The storage medium may be a non-transitory storage medium. The non-transitory storage medium means a tangible medium regardless of data being stored semi-permanently or temporarily, and does not include a signal which is propagated transitorily.

Although the technical idea according to the present disclosure has been explained by various exemplary embodiments hereinabove, the technical idea according to the present specification includes various substitutions, modifications, and changes that can be made within a scope which can be appreciated by those skilled in the art to which the present disclosure belongs. In addition, such substitutions, modifications, and changes should be understood as being included within the appended claims.

What is claimed is:

1. An anomaly detection method performed by an electronic device including one or more processors, a communication circuit which communicates with an external device, and one or more memories storing at least one instruction executed by the one or more processors, the anomaly detection method comprising:

by the one or more processors, acquiring an original data set constituted by data of a same format as target data to be subjected to anomaly detection;

determining at least one important feature among a plurality of features of data based on an autoencoder model and the original data set; and transmitting important feature information including information on the at least one important feature to the external device through the communication circuit, wherein the determining of the at least one important feature includes:

calculating a reconstruction error of the original data set by using the autoencoder model, calculating a reconstruction error of a modified data set in which a specific feature value of data included in the original data set is changed by using the autoencoder model, and calculating an importance level of the specific feature value based on the reconstruction error of the original data set and the reconstruction error of the modified data set.

2. The anomaly detection method according to claim 1, wherein the determining of the at least one important feature includes calculating each of a first reconstruction error change amount for a specific feature in a normal data set included in the original data set, and a second reconstruction error change amount for the specific feature in an anomaly data set included in the original data set.

3. The anomaly detection method according to claim 2, wherein the first reconstruction error change amount is calculated based on:

a reconstruction error of a first data set in which the value of the specific feature of each data included in the normal data set is not modified; and a reconstruction error of a second data set in which the value of the specific feature of each data included in the normal data set is modified, and the second reconstruction error change amount is calculated based on:

a reconstruction error of a third data set in which the value of the specific feature of each data included in the anomaly data set is not modified; and a reconstruction error of a fourth data set in which the value of the specific feature of each data included in the anomaly data set is modified.

4. The anomaly detection method according to claim 2, wherein the specific feature is a feature having a larger importance level than other features of the data as the first reconstruction error change amount for the specific feature is larger and as the second reconstruction error change amount for the specific feature is larger.

5. An electronic device comprising:
- a communication circuit configured to communicate with an external device;
- one or more processors; and
- one or more memories storing instructions which cause the one or more processors to perform a computation when being executed by the one or more processors,
- wherein the one or more processors are configured to:
- acquire an original data set constituted by data of a same format as target data to be subjected to anomaly detection,
- determine at least one important feature among a plurality of features of data based on an autoencoder model and the original data set, and
- transmit important feature information including information on the at least one important feature to the external device through the communication circuit, and
- wherein the determining of the at least one important feature includes:
- calculating a reconstruction error of the original data set by using the autoencoder model,
- calculating a reconstruction error of a modified data set in which a specific feature value of data included in the original data set is changed by using the autoencoder model, and
- calculating an importance level of the specific feature value based on the reconstruction error of the original data set and the reconstruction error of the modified data set.

6. An anomaly detection method performed by an electronic device including one or more processors, a communication circuit which communicates with an external device, and one or more memories storing at least one instruction executed by the one or more processors, the anomaly detection method comprising:
- by the one or more processors,
- acquiring an original data set constituted by data of a same format as target data to be subjected to anomaly detection;
- determining at least one important feature among a plurality of features of data based on an autoencoder model and the original data set; and
- transmitting important feature information including information on the at least one important feature to the external device through the communication circuit,
- wherein the determining of the at least one important feature includes calculating each of a first reconstruction error change amount for a specific feature in a normal data set included in the original data set, and a second reconstruction error change amount for the specific feature in an anomaly data set included in the original data set, and
- wherein the first reconstruction error change amount is calculated based on:
- a reconstruction error of a first data set in which a value of the specific feature of each data included in the normal data set is not modified; and
- a reconstruction error of a second data set in which the value of the specific feature of each data included in the normal data set is modified, and
- the second reconstruction error change amount is calculated based on:
- a reconstruction error of a third data set in which the value of the specific feature of each data included in the anomaly data set is not modified; and
- a reconstruction error of a fourth data set in which the value of the specific feature of each data included in the anomaly data set is modified.

* * * * *